Jan. 9, 1951     N. W. ROOP     2,537,915
CUBE FORMING TRAY FOR REFRIGERATORS
Filed Oct. 26, 1948
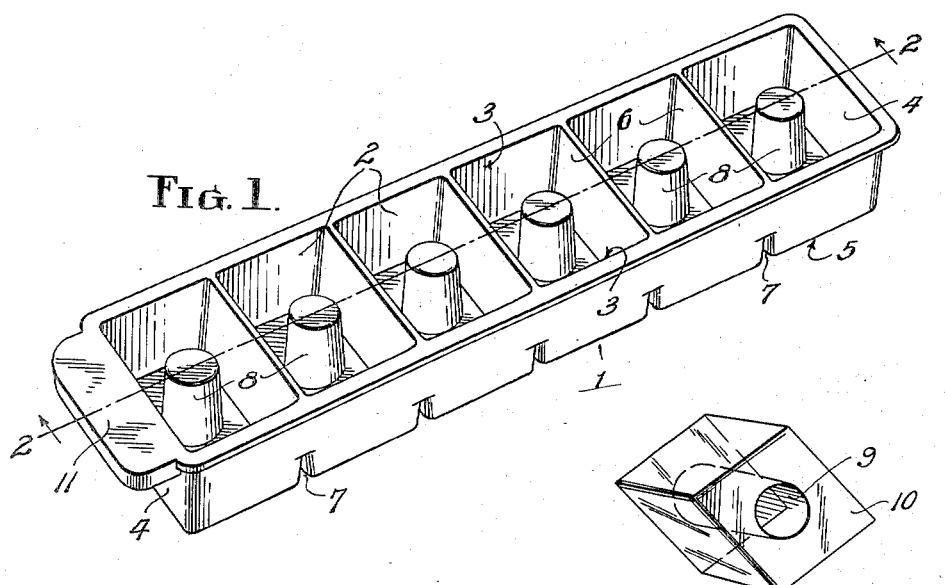
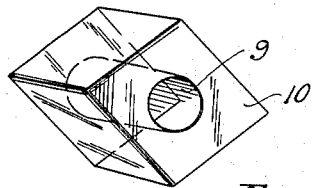
Fig. 4.
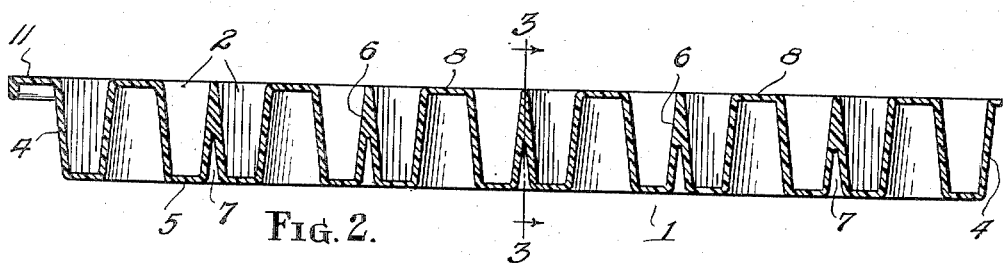
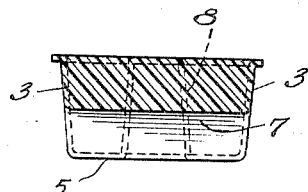
Fig. 3.
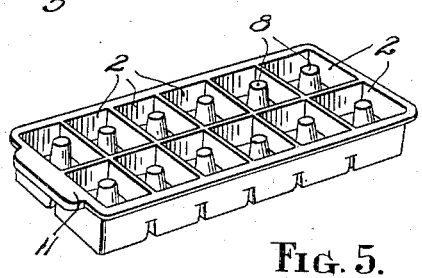
Fig. 5.
Inventor
Nathan W. Roop
Attorney Patented Jan. 9, 1951

2,537,915

UNITED STATES PATENT OFFICE 2,537,915

CUBE FORMING TRAY FOR REFRIGERATORS

Nathan W. Roop, Columbus, Ohio, assignor to Columbus Plastic Products Inc., Columbus, Ohio, a corporation of Ohio Application October 26, 1948, Serial No. 56,593

3 Claims. (Cl. 62—108.5)

This invention relates to an improved cube-forming tray for refrigerators, and has for its object to provide a tray comprising an integral molded structure of economical and efficient design.

It is another object of the invention to provide an ice-cube-freezing mold for use in domestic refrigerators in which the mold possesses a one-piece construction, being formed from a molded plastic composition.

Ice-cube-forming trays for use in domestic refrigerators are customarily formed from sheet metal. Usually the trays are provided internally with partitions to produce cavities of ice-cube forming size. Often these partitions are formed of metal, although in some instances, the same are composed of rubber or other analogous material to enable frozen cubes produced in a given tray to be conveniently separated for individual use. Metal is the material most commonly used in the construction of these pans or trays, since it possesses strength and, in addition, is a good conductor of heat, a factor which is of importance in the rapid freezing of cubes. Metal, however, has its disadvantages in this capacity, since the frozen cubes adhere firmly to the internal walls of the tray and the partitions thereof, often making it necessary to apply heat to the trays for the purpose of releasing the cubes. Trays of plastic composition overcome this objection in that their walls are sufficiently flexible to permit of their distortion to an extent adequate to enable the cubes formed therein to be readily liberated and discharged. However, trays of plastic composition do not possess the same high rate of heat conductivity as do the conventional trays of metallic composition.

It is a further object of the invention to provide in a single tray the desirable qualities of both classes of materials, that is, to provide a tray of molded plastic composition which may be readily produced on an economical manufacturing basis and one from which formed ice cubes may be readily freed, and also to so construct the tray that while it is formed from plastic materials, nevertheless, its construction will be such as to provide for efficient heat transfer so that water introduced into the pockets of the tray may be quickly frozen.

Still a further object of the invention is to provide a plastic tray having individual cube-forming pockets or cavities and wherein each pocket or cavity is provided centrally with an upstanding hollow post forming a relatively thin wall of plastic composition which will admit of a satisfactory rate of heat withdrawal from water undergoing freezing.

It is another object of the invention to provide a cube-forming tray so constructed that the ice cubes frozen therein will each possess an opening or bore extending through their bodies, whereby to increase the exposed surface area of said cubes to enable the same to more rapidly chill liquids in which the cubes are immersed.

For a further understanding of the invention, including additional objects and advantages thereof, reference is to be had to the following description and the accompanying drawing, wherein:

Fig. 1 is a perspective view of an ice-cube-freezing tray formed in accordance with the present invention;

Fig. 2 is a vertical longitudinal sectional view taken through the tray on the plane indicated by the line 2—2 of Fig. 1;

Fig. 3 is a vertical transverse sectional view taken through the tray on the line 3—3 of Fig. 2;

Fig. 4 is a perspective view of an ice cube frozen in the tray forming the present invention;

Fig. 5 is a perspective view of a modified form of tray made in accordance with the present invention, and illustrating the same as provided with dual rows of cube-forming pockets.

Referring more particularly to the drawing, the numeral 1 designates my improved ice-cube-freezing tray in its entirety. The tray is formed from a moldable plastic material, such as polyethylene, vinyl base plastics, nylon, cellulose acetate, or other of the commercially employed plastics which lend themselves readily to injection type of molding. The materials selected, however, should have the ability in the finished product to admit of a limited amount of flexibility of the tray walls. When polyethylene is used, the bending or flexing of the tray enables frozen cubes to be readily ejected from the tray pockets indicated at 2.

The pockets are produced by forming the tray to provide spaced parallel longitudinally extending side walls 3, a bottom wall 4, end walls 5 and a plurality of longitudinally spaced transversely extending partition walls 6. The forward of the end walls is formed with a lateral extension 11 constituting a gripping extension by which the tray may be engaged by the fingers of the users thereof for convenience in inserting the tray into or removing the same from the refrigerating area of a refrigerator.

It will be noted that the partition walls have their opposed surfaces arranged in angular relation with respect to each other, so that the wall surfaces tend to converge toward the top of the tray. This provides each of the partition walls with a widened base region where the same merge with the bottom wall 4 of the tray, and in this widened base portion of each partition wall, a transversely extending open bottomed recess 7 is provided which collectively impart improved flexibility to the tray, form pockets which possess angular side walls wider at the top of each pocket than at the bottom so that ice cube discharge is facilitated and, in addition, produce relatively thin partition walls for the efficient transmission of heat.

To further improve the heat-transmission characteristics of the tray, each of the pockets 2 thereof is provided with one or more integral, hollow, upstanding posts, studs or truncated cones 8 which, as shown in Fig. 4, produce bores or openings 9 in the bodies of the ice cubes 10 frozen in my improved tray. Thus by the provision of the posts or cones 8, thin tray walls are provided in the center of each pocket, enabling the heat of the water contained in each pocket to more readily pass through the walls of the pockets for the rapid freezing of cubes. In this respect, the present invention overcomes the objections heretofore advanced in the use of plastic trays in the freezing of ice cubes.

It has been recognized that the trays do possess the advantage of flexibility and convenience in the removal of frozen cubes therefrom, but experts in the field have considered the use of plastics to constitute refractory substances impeding the transmission of heat. While this is true to some degree, the present invention compromises the matter by providing thin walls of plastic composition and with the use of the hollow posts or cones 8, provision is made for withdrawing heat from the center of a body of water positioned within any one of the pockets of the tray so that the freezing of the water is hastened, the rate of heat transfer being such as to render the present tray of plastic composition competitive or comparable with that of an ordinary metallic tray. Not only is my improved tray constructed to improve heat transfer characteristics but it produces an ice cube which forms an improvement over the solid cubes hitherto formed in domestic refrigerators. The presence of the bore or opening 9 in each of these cubes substantially increases the exposed surface area thereof, so that when the cubes are immersed in a liquid for beverage-cooling purposes, the liquid is chilled more rapidly than when conventional solid cubes are employed.

In view of the foregoing, it will be seen that the present invention provides a refrigerator tray for freezing ice cubes possessing a one-piece molded construction, an improved appearance, low manufacturing costs, good heat transfer properties, convenience in the removal of frozen cubes and other useful properties.

While I have described my improved tray in its preferred embodiment, it will be understood that the same is subject to certain variation or modification without departing from the spirit or scope of the invention. For instance, in Fig. 5, the tray has been shown as formed with dual rows of the freezing pockets 2 rather than the single row of Fig. 1. Other variations will be obvious to those skilled in the art and therefore I intend to include within the purview of my invention all such modifications that may be said to fall fairly within the scope of the following claims.

I claim:

1. An ice-cube-freezing tray for refrigerators comprising: an integral molded body of plastic composition having a plurality of cube-forming pockets, said pockets being separated by longitudinally spaced transversely extending divisional walls, said walls being substantially wedge-shaped in their transverse configuration and having open bottomed slots formed in base portions of each thereof, each of said pockets being provided centrally with an upstanding hollow post-like column.

2. As a new article of manufacture, an ice-cube-freezing tray for refrigerators composed of an integral body of molded plastic composition, the walls of said body forming a multiplicity of cube-freezing pockets, the walls of said pockets possessing limited flexibility to facilitate discharge of formed cubes from said pockets, and hollow post-like bodies forming an integral part of said tray and disposed in the center of each of said pockets.

3. An ice cube-freezing tray comprising a semi-flexible integral one-piece body of molded plastic composition formed with a plurality of separate cube-forming compartments, each compartment of said tray being defined by angularly related side walls and a bottom wall formed centrally with a hollow upwardly tapered post extending to the upper level of the side walls and disposed in spaced relation thereto, a side wall of each compartment being joined with a side wall of an adjoining compartment only along the upper edges thereof, whereby to provide recesses between the individual compartments of said tray opening toward the bottom thereof, the posts formed in the bottom wall of each compartment being open at the bottom of said tray to provide heat-dissipating chambers upon the outer surface of said tray extending upwardly from the bottom of the tray a distance substantially equal to the depth of each compartment.

NATHAN W. ROOP.

REFERENCES CITED

The following references are of record in the file of this patent:

UNITED STATES PATENTS

| Number | Name | Date |
|---|---|---|
| 695,907 | Buckingham | Mar. 25, 1902 |
| 1,753,940 | Reed | Apr. 8, 1930 |
| 2,433,210 | Gits | Dec. 23, 1947 |
| 2,433,211 | Gits | Dec. 23, 1947 |
| 2,545,168 | Jocelyn | Jan. 18, 1949 |